Figure 1:
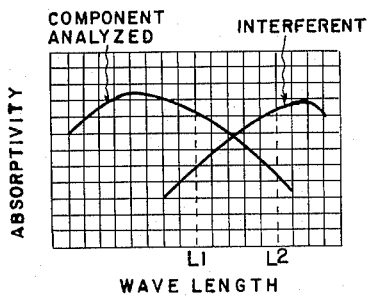

Aug. 28, 1956 — D. J. TROY, JR — 2,761,067
MULTI-COMPONENT PHOTOMETRIC ANALYSIS
Filed Jan. 26, 1953

INVENTOR
DANIEL J. TROY, JR.

Aug. 28, 1956  D. J. TROY, JR  2,761,067
MULTI-COMPONENT PHOTOMETRIC ANALYSIS
Filed Jan. 26, 1953  2 Sheets-Sheet 2

INVENTOR
DANIEL J. TROY, JR.

BY Harry J. McCauley

ATTORNEY

United States Patent Office 2,761,067
Patented Aug. 28, 1956

2,761,067

MULTI-COMPONENT PHOTOMETRIC ANALYSIS

Daniel J. Troy, Jr., Christiana Hundred, Del., assignor to E. I. du Pont de Nemours and Company, Wilmington, Del., a corporation of Delaware Application January 26, 1953, Serial No. 333,076

3 Claims. (Cl. 250—43.5)

This invention relates to the photometric analysis of multi-component fluid mixtures and particularly to an improved method and apparatus for the analysis of multi-component fluid mixtures wherein two of the fluid components each absorbs substantial radiation within the spectral region in which the analysis is conducted.

The analysis of fluids by photometric analysis, according to which the proportion of a radiation-absorptive component present is determinable as a linear function of the absorbance, which is defined as the $$\log_{10}\left(\frac{1}{T}\right)$$

where T is the transmittance, i. e., the ratio of the transmitted radiation to the incident radiation, affords a highly convenient method of control in the chemical manufacturing industry. Unfortunately, it often happens that two components are present in the fluids which it is desired to analyze each of which absorbs appreciable radiation over all of the practicably available spectral regions and therefore interferes with the analysis of the other. Interference compensation is particularly important where ultraviolet and visible radiation is employed as the analytical radiation because frequent and extensive overlapping of absorption bands is encountered in these spectral regions. Various methods of compensating for this interference have been devised including, for example, the use of two separate analyzers for the examination of the same fluid stream in conjunction with manual computing which effects a suitable compensation for one or the other of two interfering components; however, previous solutions of the problem leave much to be desired since the equipment required is expensive and complicated.

An object of this invention is to provide an improved method and apparatus for interference compensation in the photometric analysis of multi-component fluid mixtures wherein two of the fluid components each absorbs substantial radiation within the spectral region in which the analysis is conducted.

Another object of this invention is to provide an improved method and apparatus for interference compensation in the photometric analysis of multi-component fluid mixtures wherein two of the fluid components each absorbs substantial radiation within the analytical spectral region which is adapted to use in conjunction with several types of commercially available photometric analyzers with only small alterations in the existing apparatus.

Another object of this invention is to provide an improved method and apparatus for interference compensation in the photometric analysis of multi-component fluid mixtures wherein two of the fluid components each absorbs substantial radiation within the analytical spectral region which is simple, relatively low in cost and completely effective in obtaining a high accuracy of analysis in the determination of a given component.

Figure 2:
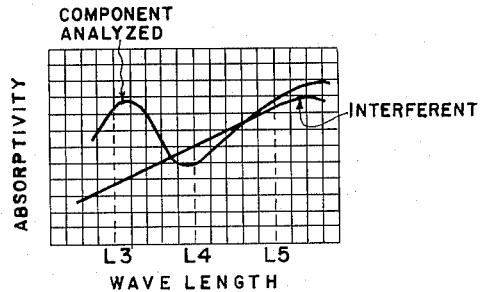
Figure 3:
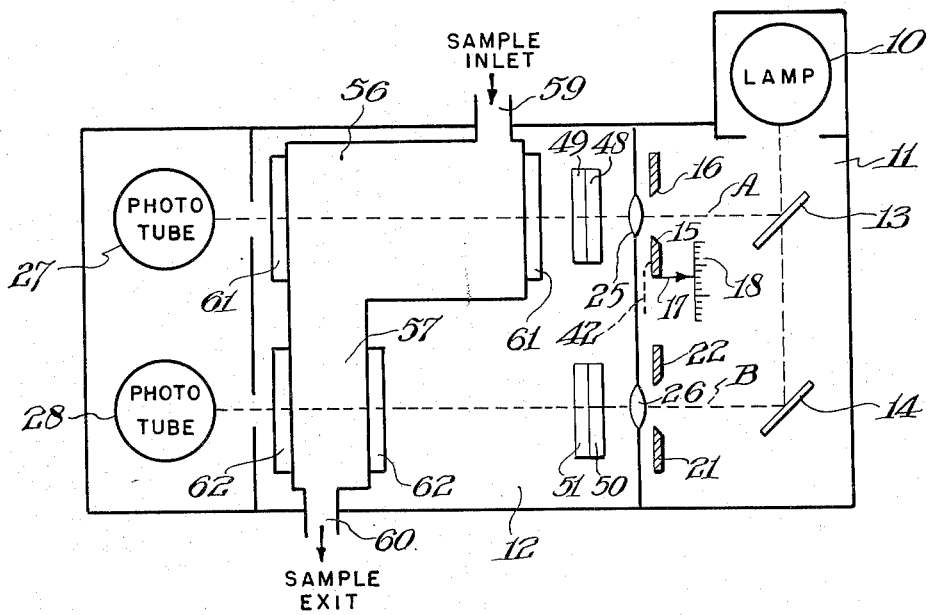
Figure 4:
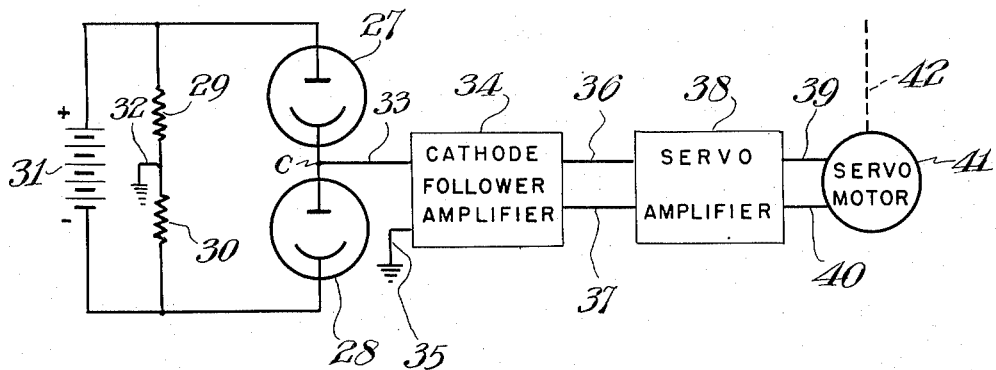
Figure 5:
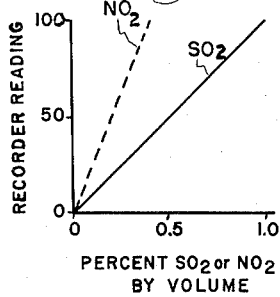
Figure 6:
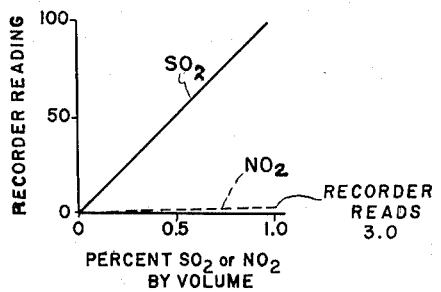

The manner in which these and other objects of this invention are attained will become apparent from the following description and drawings, in which:

Fig. 1 is a plot of absorptivity vs. wavelength of analyzing radiation for two components which display an interference pattern which is favorable to compensation according to this invention, Fig. 2 is a plot of absorptivity vs. wavelength of analyzing radiation for two components which is favorable as between two wavelengths to compensation according to this invention and unfavorable as between one of these wavelengths and a third wavelength, Fig. 3 is a schematic representation of one embodiment of apparatus which is adapted for photometric analysis according to this invention, Fig. 4 is a schematic representation of the electrical circuit employed in conjunction with the apparatus of Fig. 3, Fig. 5 is a plot of recorder reading vs. percent $SO_2$ and $NO_2$ separately for an analyzer not employing interference compensation according to this invention, and Fig. 6 is a plot of recorder reading vs. percent $SO_2$ and $NO_2$ in mixture for an analyzer employing interference compensation according to this invention.

Generally, this invention comprises a method and apparatus for interference compensation in the analysis of a multi-component fluid mixture containing a component the analysis of which is desired, i. e., the analyzed component, admixed with an interferent, i. e., a component which absorbs radiation in a manner requiring compensation over the spectral region within which the analysis is conducted, by the comparison of the ratio of the intensities of radiation transmitted by a measuring beam and a comparison beam, wherein the radiations of each beam are preselected in wavelength so that there is a substantial difference in the ratios of absorptivity of the analyzed component to the interferent in each beam, and where the thicknesses of the sample interposed in each beam are preselected so that the absorbances due to the interferent in each beam are maintained substantially equal over the range of the analysis. The term "interferent" as employed in this specification is defined as a component which absorbs radiation over the spectral region within which the analysis is conducted in a manner requiring compensation. The situation might exist where, in addition to the analyzed component, there are present a number of other components whose concentrations are always in fixed ratio one to another, in which case the term "interferent" is intended to cover these other components as a group, since the aggregate interference occasioned by the group is of the same type as that caused by a single component uncontrolled in composition but absorbing radiation over the spectral region within which analysis is conducted. Also, where one or more components are present in the sample in constant percentage or in constant proportion to the analyzed component, the interference occasioned by these components may be taken into account by initial standardization techniques well known to persons skilled in the art, whereupon these components become in effect non-interfering components, and this invention is then adapted to compensate for an interferent constituting yet another component whose concentration is not so constrained.

A suitable apparatus for practising this invention within the complete visible and ultraviolet spectral regions is the continuous ratio-measuring, double beam photometric analyzer disclosed in U. S. Patent 2,694,335, belonging to the same assignee, modified in the manner hereinafter described. An analyzer of this type is described generally as to optics and use in an article published in the Electrochemical Society Journal, vol. 97, No. 10 (October 1950), pp. 201C–204C, and as to electrical circuit in an article published in Science, vol. 114, dated Oct. 5, 1951, pp. 360–1. For use in the visible spectral region several commercially available instruments, such as the Beckman Flow Colorimeter and the Instrument Development Laboratories' "Color-Rede," are suitable. The apparatus of 2,694,335 is particularly useful for the purposes contemplated because a considerable variation in the absolute intensities of the measuring and comparison beams can be tolerated without affecting the ratio relationship between the beams and, therefore, the accuracy of analysis.

The absorptivity, or extinction coefficient, which is defined as the absorbance per unit concentration and thickness of a specific substance is characteristic of each particular material for radiation of any chosen wavelength, although the same absorptivities may exist for different substances with radiation of a given wavelength. The absorbance which has hereinbefore been defined physically, is the product of the absorptivity, the concentration of the absorbing material and the thickness of the absorbing material.

The preselection of wavelength for the two radiation beams utilized in this invention is readily accomplished, it being only necessary to choose radiations which do not display equal or near-equal ratios of absorptivity for the analyzed component and the interferent admixed therewith. It is preferred that the two beams possess rather widely different ratios of absorptivity for the analyzed component and the interferent, as sensitivity is thereby improved; however, with analytical apparatus of high inherent sensitivity a smaller difference in absorptivity ratio can be tolerated. An ideal interference pattern for the purposes of this invention is that shown in Fig. 1, where the ratio of absorptivity of the component analyzed to the absorptivity of the interferent is markedly different at the wavelength $L_1$ as compared to the same ratio at the wavelength $L_2$, wherefor one of these wavelengths may be used for one beam while the other wavelength may be used for the other beam. The interference pattern shown in Fig. 2 represents a case where the absorptivity relation for one pair of wavelengths is suitable and for another pair unsuitable. Thus, wavelengths $L_3$ and $L_4$ display a great difference in ratios of absorptivities and these wavelengths may be utilized, while $L_4$ and $L_5$ display a relatively small difference in ratios of absorptivities and are therefore less satisfactory. Wavelengths $L_3$ and $L_5$ lie intermediate the other pairs and, while not so extreme in ratio difference as $L_3$ and $L_4$, nevertheless are preferred over the pair $L_4$, $L_5$.

Once the wavelengths of the two beams are preselected as is hereinabove described it is necessary to preselect the thicknesses of the samples to be associated with each beam during the analysis and this can conveniently be accomplished empirically by selecting a cell for interposition in the beam, hereinafter called the measuring beam, having the highest ratio of absorptivity of analyzed component to interferent of a length such that a satisfactory sensitivity of response is obtained when sample is introduced into this cell and thereafter selecting the other cell with a length such that no difference in absorbance exists between the two cells filled with sample containing interferent, the percent analyzed component being zero, at any concentration of interferent which can be expected to exist during analysis. A cell provided with a sliding sleeve sealed with a bellows or gasket, such as the design of telescopic cell shown in U. S. P. 2,490,345, so that the thickness of sample interposed in the path of the second beam may be varied at will, is a useful aid in matching the two cells so that the absorbancies of the interferent in both beams are made equal. The preselection of the correct sample thicknesses (or cell lengths) is readily accomplished by exposing samples consisting of the pure interferent in admixture with a non-absorbing fluid in each beam of preselected wavelength for each cell length and repeating the test at a different concentration of interferent, whereupon the proper cell length is that with which no change in the ratio of transmitted radiation intensities, i. e., no change in absorbance due to the interferent, is detected by the analyzer between any two tests. Experience in cell selection indicates that accuracy of proportioning of the order of about 1% of the cell length effects complete compensation to a close approximation where the absorbances of the analyzed component and the interferent are of the same order of magnitude. When the interferent absorbs more strongly, proportionately greater precision in cell selection is necessary.

Referring to Figs. 3 and 4, the continuous ratio-measuring double beam photometric analyzer which is the subject of U. S. Patent 2,694,335 is modified as hereinafter described to achieve compensation according to this invention. The analyzer per se comprises the single radiation source 10, all of the optical elements within compartment 11, and the two phototubes 27 and 28, together with the entire electrical circuit of Fig. 4. The apparatus of this invention comprises all elements housed within compartment 12.

The analyzer is provided with a semi-transparent mirror 13 which reflects a portion of the radiation emanating from source 10 as one beam A, which is hereinafter called the "measuring beam," while passing the remainder of the radiation to mirror 14 which reflects this portion to form a second beam, B, which is hereinafter called the "comparison beam." The measuring beam passes a radiation gate consisting of a movable element 15 and a fixed element 16, both of which are opaque to the analyzer radiation, and the relative positioning of which controls the quantity of radiation passed to the measuring sample cell 56 housed in compartment 12. Radiation gate element 15 is provided with a pointer 17 fixed thereto, the movement of which, relative to fixed scale 18 calibrated in percent concentration of the analyzed component, apprises the operator of the analysis. The comparison beam is provided with its own radiation gate, similar to that of the measuring beam, consisting of fixed element 22 and movable element 21, the relative positioning of which controls the quantity of radiation passed to the comparison cell 57 housed in compartment 12. The comparison beam radiation gate is provided as a means for initially standardizing the instrument on a sample containing a known amount of the analyzed component, the concentration of any admixed interferent being immaterial. Condensing lenses 25 and 26 in the measuring beam and comparison beam, respectively, direct the radiation of the beams through the sample cells interposed in each beam to phototube 27, for the measuring beam, and phototube 28, for the comparison beam.

As shown in Fig. 4, phototubes 27 and 28 are connected in series-aiding relationship in a bridge network including resistors 29 and 30 powered from source 31, which may be a 40 volt "B" battery. A ground connection 32 is provided between resistors 29 and 30, and a connection 33 is provided on the opposite side of the network for the detection of a difference in potential between the point of connection C of 33 and ground. The signal voltage of connection 33 is impressed on one grid element of the dual-triode cathode follower amplifier 34, the other grid of which is grounded at 35. In order that the bridge network will function with satisfactory sensitivity over the full range of radiation intensity normally encountered, the effective resistance which the cathode follower circuit imposes between connection C and ground should be about 10,000 megohms or greater. Amplifier 34 powers servo-amplifier 38 through leads 36 and 37, and amplifier 38 powers servo-motor 41 through leads 39 and 40. Servo-motor 41 actuates mechanical connection 42, drivingly connected to movable element 15 of the measuring beam radiation gate, moving 15 in the proper amount and direction to maintain electrical null-balance in the bridge network comprising phototubes 27 and 28. Since the current passed by phototubes 27 and 28 is directly proportional to the radiation impinging on each, the signal potential impressed on connection 33 is directly proportional to the ratio of the intensities of the radiations transmitted by the measuring and comparison beams, i. e., to the difference in absorbancies of the samples interposed in each beam.

As hereinbefore described the objectives of this invention are attained by the proper preselection of the wavelength of light in the measuring and comparison beams and the proper preselection of the sample thickness in each beam once the radiation wavelengths are established. For purposes of explanation a greater thickness of sample is shown in the measuring beam of Fig. 3 than in the comparison beam. This assumes that the absorptivity of the interferent to the radiation of the comparison beam of Fig. 3 is greater than its absorptivity to the radiation of the measuring beam. It will be understood that the reverse situation might equally well obtain, in which case the sample of greater thickness would then be interposed in the comparison beam.

The sample cell 56 in the measuring beam is in open communication with the sample cell 57 in the comparison beam, sample material being circulated continuously through each of the cells in series from sample inlet 59 to sample exit 60. It will be apparent that the direction of sample flow is of no consequence, and that the sample can be circulated to the cells in parallel flow if conditions make such circulation advantageous. The invention is equally applicable to the discontinuous analysis of individual samples by utilizing individual pairs of cells of preselected length; however, continuous analysis is usually preferred for industrial control.

Sample cell 56 is provided with radiation-transmitting windows 61 disposed in the path of radiation travel and sample cell 57 is similarly equipped with windows 62. The wavelength of the measuring beam radiation impinging on the sample is established by filter assembly 48, 49 while the wavelength of the comparison beam radiation impinging on the sample is established by filter assembly 50, 51.

A typical case in which interference compensation according to this invention was successful was that in which it was necessary to analyze for $SO_2$ in the presence of $NO_2$ and air. The sample gas was a process stream wherein the concentration of $SO_2$ varied over the range 0–1.0%, while the $NO_2$ concentration varied from 0–0.5%, the balance being air, which is a non-interfering component. The absorptivity ratio of $SO_2$ to $NO_2$ at 313 m$\mu$ is approximately 0.37 and at 365 m$\mu$ is less than 0.001, wherefor the criterion for radiation preselection hereinabove described was satisfied by employing 313 m$\mu$ radiation in the measuring beam and 365 m$\mu$ radiation in the comparison beam. The analyzer utilized was a two-beam, ratio-measuring instrument of the design hereinabove described having a type S4 mercury vapor lamp as the radiation source 10 and RCA Type 935 vacuum tubes as the phototubes 27 and 28. The 313 m$\mu$ radiation was readily obtained with a filter assembly 48, 49 comprising two glass filters (Corning Nos. 9863 and 9700) in conjunction with a fused quartz absorption cell containing a 0.17 g./l. alkali-stabilized solution of $K_2CrO_4$ 0.75" thick. The 365 m$\mu$ radiation was isolated with a filter assembly 50, 51 comprising two glass filters (Corning Nos. 5860 and 738).

The interference occasioned in the analysis of $SO_2$ by the presence of $NO_2$ is considerable, as will be apparent by reference to the plots of Fig. 5, the absorbancy for $NO_2$ alone in air with a thickness of sample of 4.00" over the range 0–0.5% being appreciably greater than the absorbancy for $SO_2$ alone in air over the range 0–1.0% using the same thickness. Obviously, a two-beam, ratio-measuring analyzer is utterly incapable of analyzing a mixture of $NO_2$ and $SO_2$ in air without compensation of a high order.

The compensation afforded by this invention was obtained by selecting a measuring beam cell 56 of a length of 4.00", which is a suitable size for the analysis contemplated as determined by calibration, and proportioning the comparison beam cell 57 to obtain equal absorbancies due to $NO_2$ for two concentrations relatively widely separated over the $NO_2$ range. A cell 57 length of 1.45" was readily selected using machining techniques of a precision equal to 1% of the length of cell 57. As shown in Fig. 6, the resulting analyzer effected a great compensation, in that a sample of $NO_2$ in air alone gave a recorder reading of only 3% of full scale for a concentration of $NO_2$ of 1.0%, which was twice the maximum to be expected in the process gas, an accuracy of analysis entirely satisfactory for the purposes. The compensation could be rendered complete, if a greater accuracy of analysis was required, by more precise machining of the cell 57 to a length of 1.465". Full-scale deflection of the analyzer in the example reported corresponded to an absorbance difference due to $SO_2$ between the cells in the measuring and comparison beams of 0.17. The importance of having an analyzer capable of accurately measuring ratios of intensities over a wide range of variation of intensity is emphasized by the fact that the intensities for each beam of the analyzer reported decreased 40% over the range of variation of $NO_2$ from 0–0.5%, nevertheless, the ratios of the intensities of the beams remained constant throughout to a high degree. Change in the ambient temperature of the analyzer results in small varation in the intensity ratio of the radiation impinging on the sample cells; however, spurious readings from this cause can be eliminated by providing the analyzer with good thermal insulation, by the use of forced air circulation within the analyzer housing and in other ways known to the art.

The cell proportioning necessary to obtain equal absorbancies due to the interferent in the two radiation beams is conveniently expressible in terms of the range of ratios of cell lengths which can be used in conjunction with the ranges of preselected wavelengths with which a specific analysis is conducted. Thus, in the analysis of $SO_2$ in the $SO_2$—$NO_2$—air system, where the measuring beam radiation wavelength chosen may lie anywhere between about 280 m$\mu$ and 334 m$\mu$, and the comparison beam radiation wavelength between about 334 m$\mu$ and 436 m$\mu$, provided there is a difference of at least 20 m$\mu$ between the measuring beam and comparison beam wavelengths, the corresponding range of cell ratios (measuring beam/comparison beam) may be from about 1.4 to 8.2. Obviously, the absolute dimensions of the two cells are not restricted by the method of compensation herein disclosed, the only necessity being that the ratio of cell lengths (or sample thicknesses) be constant over the full range of analysis. This is advantageous, since it is sometimes desirable to adjust the sensitivity of analysis while maintaining a particular value of full-scale absorbance difference between the two beams, and this freedom is preserved, in that it is possible to multiply both sample thicknesses by the same factor without disturbing the interferent absorbance equality required for compensation according to this invention. The latitude of choice of wavelengths and sample thicknesses is also very broad, as is indicated for the specific $SO_2$—$NO_2$—air example hereinabove described, and absolute absorbancies due to the interferent can conveniently range up to about 3.0, while still causing no change in the intensity ratio between the beams.

It will be apparent to persons skilled in the art that this invention may be modified in many ways without departing from its essential spirit, such as, for example, by utilizing a single detection phototube in conjunction with a light chopper instead of the design of analyzer specifically represented in Figs. 3 and 4. Also, an analyzer in which the two preselected radiation wavelengths are obtained from separate sources can be employed providing the ratio of intensities of the two wavelengths does not vary substantially in the course of analysis. Numerous other modifications of the type described are possible, wherefor it is desired to be limited only by the scope of the appended claims.

What is claimed is:

1. In the photometric analysis of samples consisting of an analyzed component admixed with one interferent and any number of non-interfering components by the comparison of the ratios of intensity of radiation transmitted by a measuring beam and a comparison beam, the method of compensating for interference between said analyzed component and said interferent comprising examining the sample with a measuring beam of a first wavelength passed through a first thickness of said sample and examining the sample with a comparison beam of a second wavelength passed through a second thickness of said sample, said first and second wavelengths being preselected so that a substantial difference in the ratios of absorptivity of said analyzed component to the absorptivity of said interferent exists at each of said wavelengths and said first and second thicknesses of sample being preselected so that the absorbancies due to said interferent in said measuring and comparison beams are maintained substantially equal over the range of said analysis.

2. In the photometric analysis of samples consisting of an analyzed component admixed with one interferent and any number of non-interfering components by the comparison of the ratios of intensity of radiation transmitted by a measuring beam and a comparison beam the method of compensating for interference between said analyzed component and said interferent according to claim 1 wherein said analyzed component consists of $SO_2$, said interferent consists of $NO_2$ and said non-interfering component consists of air, said measuring beam consists of radiation of a wavelength in the range of about 280 m$\mu$ to 334 m$\mu$, and said comparison beam consists of radiation of a wavelength in the range of about 334 m$\mu$ to 436 m$\mu$, the radiations of said measuring beam and said comparison beam differing by at least 20 m$\mu$ in wavelength.

3. In a photometric analyzer of the ratio-measuring type having a measuring radiation beam and a comparison radiation beam apparatus for the compensation of interference between an analyzed component admixed with one interferent and any number of non-interfering components comprising the combination of means developing a first preselected wavelength in said measuring radiation beam, means developing a second preselected wavelength in said comparison radiation beam having an intensity in substantially constant ratio to the intensity of said measuring radiation beam of first preselected wavelength, said first and second preselected wavelengths displaying a substantial difference in the ratios of absorptivity of each of said wavelengths for said analyzed component and said interferent, a first sample cell disposed in said measuring radiation beam, a second sample cell disposed in said comparison radiation beam, the length of said first sample cell measured in the direction of travel of said measuring radiation beam and the length of said second sample cell measured in the direction of travel of said comparison radiation beam being preselected so that the absorbency of said interferent at said first preselected wavelength is substantially equal to the absorbency of said interferent at said second preselected wavelength over the range of said analysis, and means for introducing sample into each of said cells.

References Cited in the file of this patent

UNITED STATES PATENTS

| Re. 23,023 | Wolf et al. | Aug. 3, 1948 |
| 2,395,489 | Major et al. | Feb. 26, 1946 |
| 2,613,572 | Mathieu | Oct. 14, 1952 |